April 26, 1949.   C. H. SPARKLIN   2,468,128
SUCTION CLEANER AND FAN THEREFOR
Filed Oct. 12, 1944   3 Sheets-Sheet 1

Inventor,
Charles H. Sparklin,
By Stratton, Wiles, Schroeder,
& Merriam
Attys

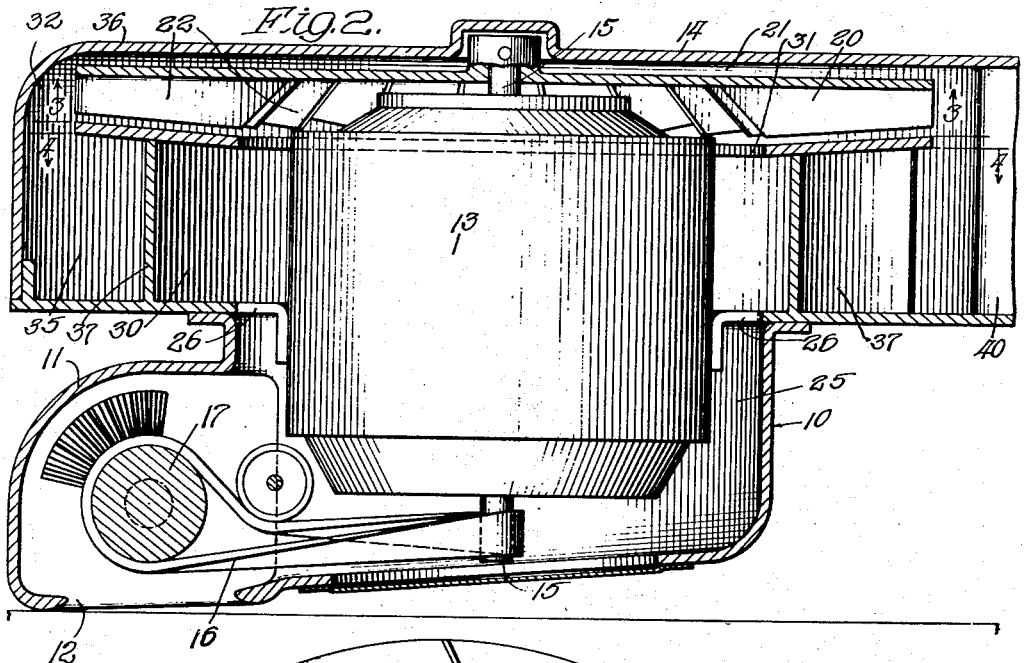
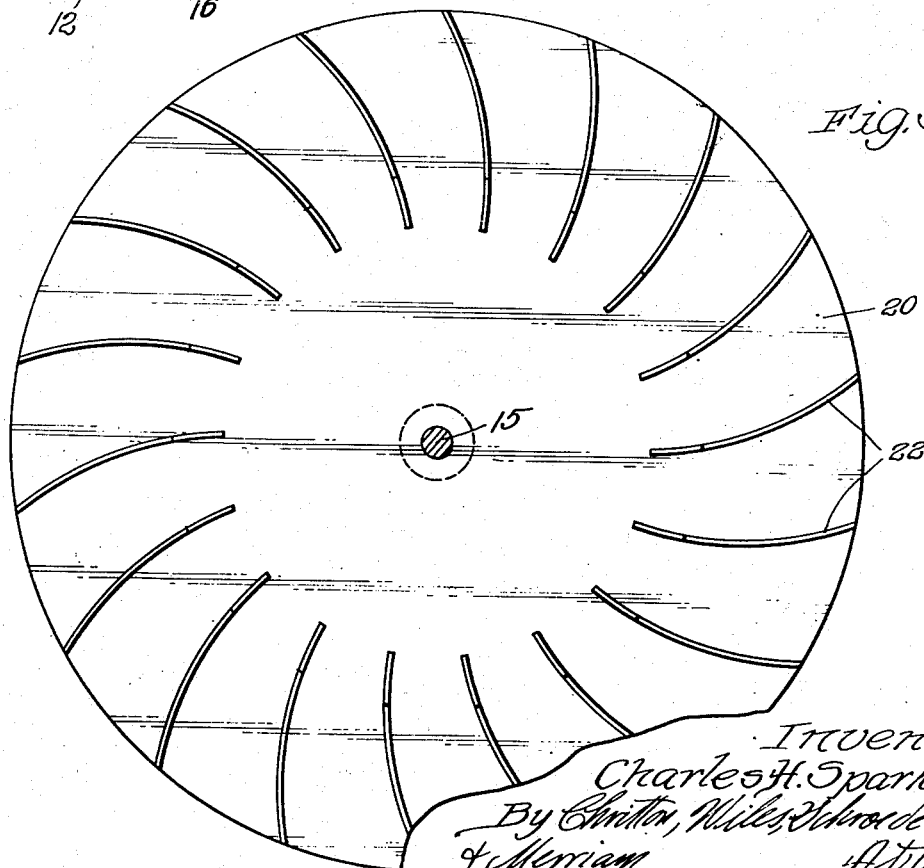

April 26, 1949.

C. H. SPARKLIN 2,468,128

SUCTION CLEANER AND FAN THEREFOR

Filed Oct. 12, 1944

3 Sheets-Sheet 3

Inventor
Charles H. Sparklin.
By Christen, Wiles, Schroeder,
& Merriam
Attys.

Patented Apr. 26, 1949

2,468,128

UNITED STATES PATENT OFFICE 2,468,128

SUCTION CLEANER AND FAN THEREFOR

Charles H. Sparklin, Chicago, Ill., assignor to Birtman Electric Company, a corporation of Illinois Application October 12, 1944, Serial No. 558,328

9 Claims. (Cl. 103—117)

This invention relates to a suction cleaner and fan therefor and more particularly to a centrifugal air fan of small cross-sectional area.

The common centrifugal fan includes an air collection chamber of volute form which delivers air from the periphery of the air collection chamber to the fan chamber, and a volute air disposal chamber which collects air from the periphery of the fan and conducts it to the exhaust. The volutions of the air collection and air disposal chambers are desirable for the efficiency of the fan in order to provide an air movement path of constantly increasing cross-section. Such a fan, however, has an excessively large cross-section as well as an asymmetrical shape. In the present invention the size of the fan is reduced and its shape made symmetrical by providing an involute air disposal chamber having a circular outer wall and an involute inner wall which is also the volute outer wall of the air collection chamber.

Figure 1:
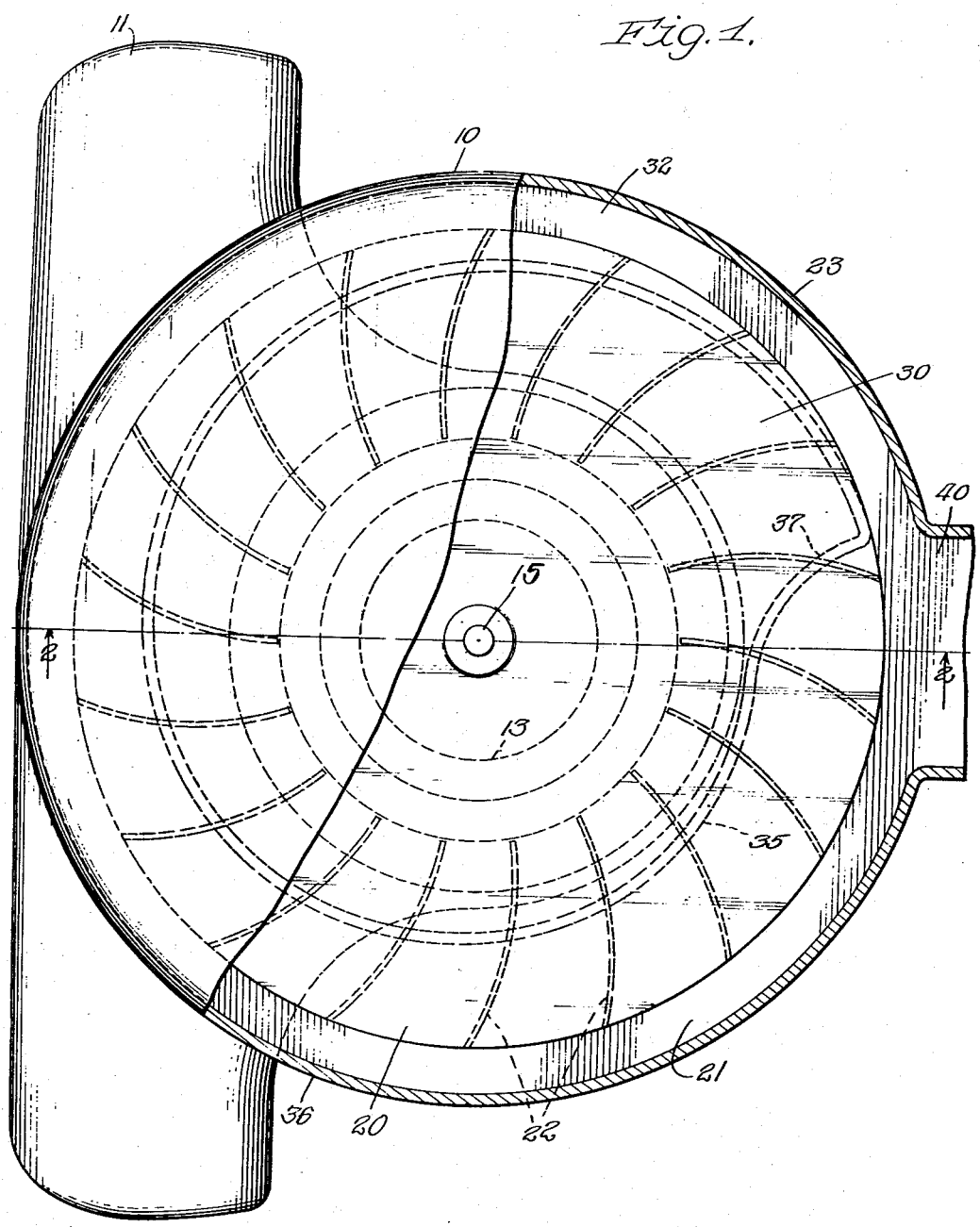
Figure 4:
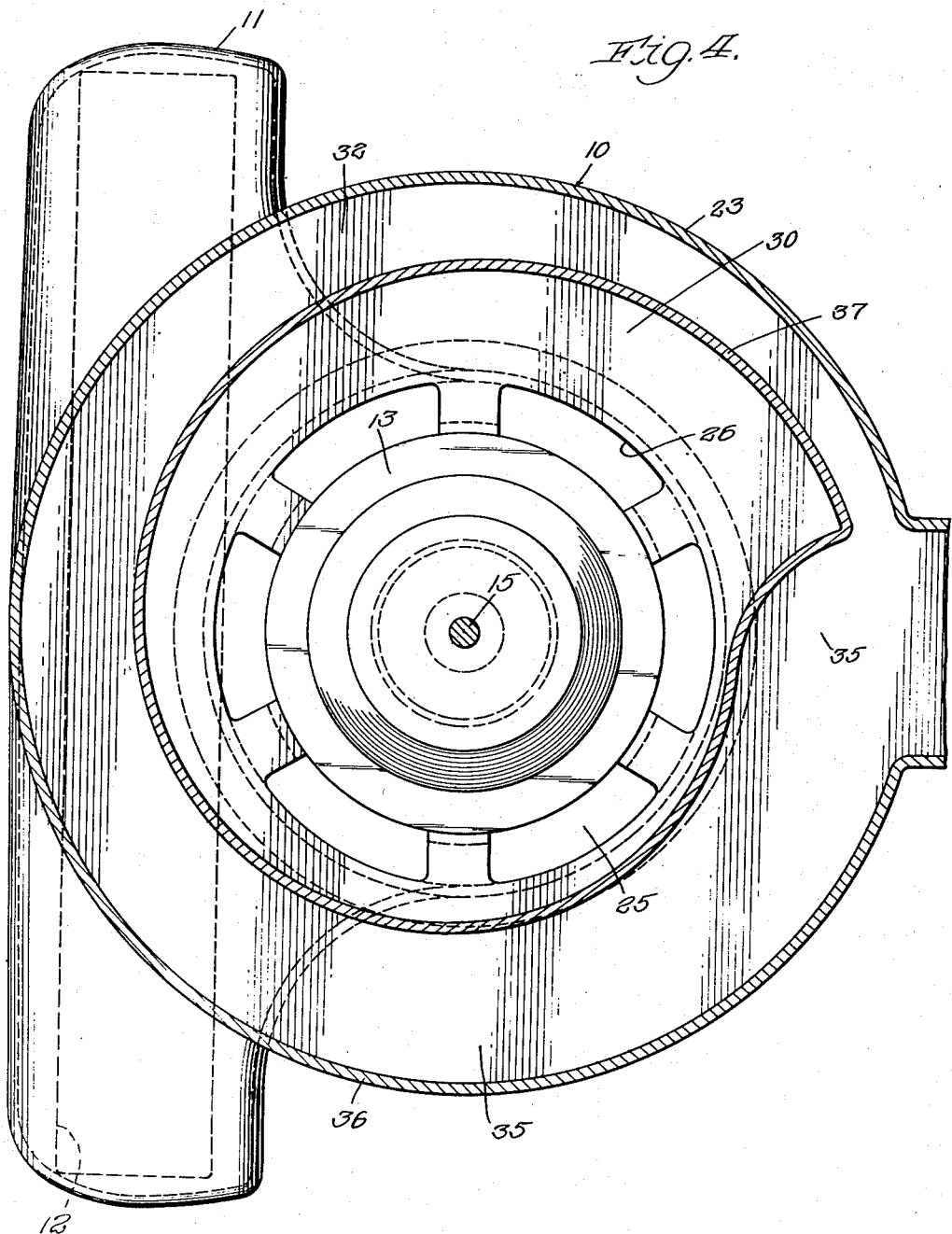

The invention is illustrated in the drawings, in which Figure 1 is a plan view, partly in section, of a suction cleaner embodying the fan; Figure 2 is a vertical section taken along the line 2—2 in Figure 1; Figure 3 is a horizontal section taken along the line 3—3 in Figure 2, looking upwardly; and Figure 4 is a horizontal section taken along the line 4—4 in Figure 2, looking downwardly.

The suction cleaner 10 comprises the customary nozzle chamber 11 having a cleaning opening 12 adjacent the floor. A motor 13 is mounted in the cleaner housing 14 and has a vertical shaft 15, the lower end of which drives the belt 16, which in turn operates the brush 17 in the nozzle chamber. The centrifugal air fan 20 is mounted on the upper end of the shaft 15, being disposed within the cylindrical fan chamber 21. The fan comprises a plurality of curved blades 22 which direct the air centrifugally outward toward the circular outer edge 23 of the fan chamber.

Air is collected through the opening 12 in the nozzle chamber and passes into the annular air passageway 25 and then through the openings 26 into a volute air collection chamber 30 which is arranged about the motor and adjacent the fan chamber 21. Air from the collection chamber passes through the opening 31 into the fan chamber. Air is then driven by the blades into the annular portion 32 of the fan chamber beyond the ends of the fan blades. It then reverses its movement and enters the involute disposal chamber 35. It will be noted that the fan chamber 21, the air collection chamber 30 and the air disposal chamber 35 together form a circular cylinder 36. This is accomplished by having the inner wall 37 of the involute air disposal chamber form the outer wall of the volute air collection chamber 30. A symmetrical three-element fan system is thus formed without waste space and entirely within the dimensions of the fan chamber itself.

As will be seen in Figure 1, the fan chamber 21 and the air disposal chamber 35 are in open communication at the peripheries thereof. The size of the opening is uniform. Air collected in the air disposal chamber passes to the exhaust 40.

The foregoing detailed description has been given for clearness of understanding only, and no unnecessary limitations should be understood therefrom.

What I claim as new, and desire to secure by Letters Patent, is:

1. In a fan chamber, a volute air collection chamber communicating with the inner portion of a cylindrical fan chamber adjacent the center thereof, a fan blade mounted for rotary centrifugal action in the fan chamber, an involute air disposal chamber having a substantially circular outer wall and communicating with the fan chamber substantially throughout the periphery thereof, and an exhaust opening from the air disposal chamber.

2. A fan as set forth in claim 1, in which the outer wall of the volute air collection chamber is also the inner wall of the involute air disposal chamber.

3. In a fan chamber as set forth in claim 1, a circular cylindrical housing for the fan chamber defining the outer wall of the involute air disposal chamber.

4. A fan comprising a shaft; a series of curved blades mounted on the shaft and shaped to direct air centrifugally therefrom; a motor mounted on the shaft adjacent the blades; a circular cylindrical housing substantially concentric about the fan and at least a portion of the motor; and means within the housing subdividing the portion thereof outside of the motor into a volute air collection chamber, an involute air disposal chamber, and a cylindrical fan chamber, the outer wall of the volute air collection chamber and the inner wall of the involute air disposal chamber being common.

5. A fan including a volute air collection chamber having openings communicating on one side thereof with the atmosphere, a substantially cylindrical fan chamber adjacent the air collection chamber and communicating therewith on the vacuum side of the fan chamber and adjacent the center thereof, an involute air disposal chamber having a substantially circular outer wall about the volute air collection chamber and communicating with the fan chamber about substantially its entire periphery, a plurality of curved fan blades adapted to drive air centrifugally toward the periphery of the fan chamber, and means for rotating the fan blades.

6. In a fan, a substantially cylindrical housing having substantially less length in diameter than width, a partition wall perpendicular to the axis of the cylinder and dividing the housing into a fan chamber at one end thereof and an air collection and disposal system at the other end thereof, said system comprising an inner volute air collection system communicating with the fan chamber through an annular opening in the partition, an involute air disposal chamber radially outside of the volute chamber and separated therefrom by a common partition wall, said air disposal chamber communicating with the fan chamber through an annular opening immediately inside the housing, a centrifugal fan in the fan chamber, and means for driving said fan.

7. A fan as set forth in claim 6, in which the fan blades extend from inside of the annular opening between the fan chamber and the air collection chamber to the inside of the annular opening between the fan chamber and the air disposal chamber.

8. A fan chamber as set forth in claim 6, in which the means for driving the fan include a motor having a housing at least partially within the cylindrical housing, and the outer wall of said motor housing forms the inner wall of the volute chamber.

9. A fan including a volute air collection chamber having openings communicating on one side thereof with the atmosphere, a substantially cylindrical fan chamber adjacent the air collection chamber and communicating therewith on the vacuum side of the fan chamber, an involute air disposal chamber about the volute air collection chamber having a substantially circular outer wall and communicating with the fan chamber about substantially its entire periphery, a plurality of curved fan blades adapted to drive air centrifugally toward the periphery of the fan chamber, and means for rotating the fan blades, said volute air collection chamber having its outer wall forming the inner wall of the involute air disposal chamber.

CHARLES H. SPARKLIN.

REFERENCES CITED

The following references are of record in the file of this patent:

UNITED STATES PATENTS

| Number | Name | Date |
| --- | --- | --- |
| Re. 22,336 | Bible | June 22, 1943 |
| 1,857,965 | Lidiak | May 10, 1932 |
| 1,878,858 | Kitto | Sept. 20, 1932 |
| 1,914,834 | Otto | June 20, 1933 |
| 2,058,371 | Van Roosen | Oct. 20, 1936 |
| 2,069,640 | Beardsley, Jr. | Feb. 2, 1937 |
| 2,116,233 | Cole | May 3, 1938 |
| 2,157,609 | Hopkins | May 9, 1939 |
| 2,187,164 | Leathers | Jan. 16, 1940 |
| 2,307,283 | Lonergan | Jan. 5, 1943 |
| 2,322,302 | Martinson | June 22, 1943 |

FOREIGN PATENTS

| Number | Country | Date |
| --- | --- | --- |
| 94,086 | Switzerland | Apr. 1, 1922 |
| 246,659 | Great Britain | Feb. 4, 1926 |
| 309,632 | Germany | Dec. 4, 1918 |
| 676,564 | France | Nov. 29, 1929 |